(12) United States Patent
Bard et al.

(10) Patent No.: US 8,477,588 B2
(45) Date of Patent: Jul. 2, 2013

(54) HIGH POWER OPTICAL DISC DRIVES

(75) Inventors: Erik C. Bard, Lehi, UT (US); Douglas P. Hansen, Spanish Fork, UT (US); Barry M. Lunt, Provo, UT (US); Raymond T. Perkins, Orem, UT (US); Mark O. Worthington, Montrose, CA (US)

(73) Assignee: Brigham Young University, Provo, UT (US)

( * ) Notice: Subject to any disclaimer, the term of this patent is extended or adjusted under 35 U.S.C. 154(b) by 31 days.

(21) Appl. No.: 12/626,769

(22) Filed: Nov. 27, 2009

(65) Prior Publication Data

US 2010/0135147 A1 Jun. 3, 2010

Related U.S. Application Data

(60) Provisional application No. 61/200,449, filed on Nov. 28, 2008.

(51) Int. Cl.
*G11B 7/00* (2006.01)

(52) U.S. Cl.
USPC ........ 369/121; 369/100; 369/124.1; 369/47.5

(58) Field of Classification Search
CPC ........................................................ G11B 7/00
USPC ....... 369/4.5, 112.23, 124.1, 47.28; 347/225; 428/64.5, 112.23, 124.1, 121, 100, 47.5
See application file for complete search history.

(56) References Cited

U.S. PATENT DOCUMENTS

| 4,577,291 | A | * | 3/1986 | Cornet | 365/126 |
| 7,110,335 | B2 | * | 9/2006 | Mizushima et al. | 369/47.5 |
| 7,123,641 | B2 | | 10/2006 | Hirukawa et al. | |
| 7,613,869 | B2 | * | 11/2009 | Lunt et al. | 711/102 |
| 2003/0048709 | A1 | * | 3/2003 | Van Woudenberg | 369/47.28 |
| 2003/0222965 | A1 | * | 12/2003 | Field | 347/225 |
| 2004/0241575 | A1 | | 12/2004 | Ootera | |
| 2006/0244811 | A1 | * | 11/2006 | No | 347/250 |
| 2007/0121445 | A1 | * | 5/2007 | Nishimura et al. | 369/47.5 |
| 2007/0281123 | A1 | | 12/2007 | Umezawa et al. | |
| 2008/0320205 | A1 | * | 12/2008 | Lunt et al. | 711/102 |
| 2009/0141615 | A1 | * | 6/2009 | Nakai et al. | 369/112.23 |
| 2009/0231978 | A1 | * | 9/2009 | Lunt et al. | 369/100 |
| 2009/0252005 | A1 | * | 10/2009 | Ushiyama et al. | 369/47.5 |
| 2010/0068444 | A1 | * | 3/2010 | Asplund et al. | 428/64.5 |
| 2010/0135147 | A1 | | 6/2010 | Bard et al. | |
| 2010/0226218 | A1 | * | 9/2010 | Nakamura et al. | 369/47.5 |

FOREIGN PATENT DOCUMENTS

| KR | 10-2003-0003344 | 1/2003 |
| KR | 10-0581638 | 5/2006 |
| KR | 10-2008-0068980 | 7/2008 |
| WO | WO2006/049759 A1 | 5/2006 |
| WO | WO2010/063004 A2 | 6/2010 |

OTHER PUBLICATIONS

Asthana, et al., Rewritable optical disk drive technology, *IBM J. Res. Dev.* (Sep. 1996), 40(5):543-558 (Abstract).

(Continued)

*Primary Examiner* — Thuy Pardo
(74) *Attorney, Agent, or Firm* — Workman Nydegger (57) ABSTRACT

High power optical disc drives are disclosed. The drives are configured to deliver laser energy having a power of at least about 25 mW as measured at DVD 1× write speed upon first contact with the surface of an optical disc.

30 Claims, 5 Drawing Sheets

OTHER PUBLICATIONS

Cx-News. Sony Semiconductor News, Optical Disc Record System Semiconductor Laser Diode Lineup, 250 mW Semiconductor Laser Diodes that Contribute to Faster Data Write Operations in CD-R/RW and 100 mW Semiconductor Laser Diodes for DVD+R/RW and DVD-R/RW, vol. 31 (date unavailable), Feb. 5, 2005.

Sanyo announces development of a High-Power Blue-Violet Laser Diode for Next Generation Optical Discs, Sanyo Electric Co., Ltd. News Release dated Mar. 26, 2003.

* cited by examiner

| Disc | Speed | Power | Time | Tip | 3Ttop | Mark Size: 4Ttop | 4Ttop | E3 (pJ) 3.0 | E4 (pJ) 4.0 | E5 (pJ) 5.0 | E6 (pJ) 6.0 | E7 (pJ) 7.0 | E8 (pJ) 8.0 | E9 (pJ) 9.0 | E10 (pJ) 10.0 | E11 (pJ) 11.0 | E14 (pJ) 14.0 |
|---|---|---|---|---|---|---|---|---|---|---|---|---|---|---|---|---|---|
| Sony +R | 1 | 11.7 | 406 | 438 | 625 | 563 | | 279.6 | 447.7 | 629.3 | 810.9 | 992.5 | 1174.1 | 1355.7 | 1537.3 | 1718.9 | 2263.7 |
|  | 4 | 27.6 | 375 | 438 | 750 | 594 | | 197.8 | 272.2 | 371.1 | 470.1 | 569.0 | 567.9 | 766.8 | 865.7 | 964.7 | 1261.4 |
|  | 8 | 60 | | 438 | 781 | 594 | | 223.9 | 295.9 | 403.4 | 510.9 | 618.5 | 726.0 | 833.5 | 941.0 | 1048.6 | 1371.1 |
| TDK +R | 1 | 12.1 | 406 | 438 | 594 | 563 | | 274.8 | 463.0 | 650.9 | 838.7 | 1026.5 | 1214.3 | 1402.1 | 1589.9 | 1777.7 | 2341.1 |
|  | 4 | 27.7 | 375 | 438 | 719 | 594 | | 190.4 | 273.2 | 372.5 | 471.8 | 571.1 | 670.3 | 769.6 | 868.9 | 968.2 | 1266.0 |
|  | 8 | 56 | | 438 | 750 | 594 | | 200.7 | 276.2 | 376.5 | 476.9 | 577.2 | 677.6 | 777.9 | 878.3 | 978.6 | 1279.7 |
| Maxnx +R | 1 | 10.4 | 406 | 438 | 625 | 563 | | 248.5 | 398.0 | 559.4 | 720.8 | 882.3 | 1043.7 | 1205.1 | 1366.5 | 1527.9 | 2012.2 |
|  | 4 | 26.6 | 375 | 438 | 719 | 594 | | 182.8 | 262.4 | 357.7 | 453.0 | 548.4 | 643.7 | 739.0 | 834.4 | 929.7 | 1215.7 |
|  | 8 | 55 | | 438 | 719 | 594 | | 189.0 | 271.2 | 369.8 | 468.4 | 566.9 | 665.5 | 764.1 | 862.6 | 961.2 | 1256.9 |
| Phillips +R | 1 | 11.4 | 406 | 438 | 610 | 594 | | 265.9 | 449.8 | 626.7 | 803.7 | 980.6 | 1157.5 | 1334.5 | 1511.4 | 1688.4 | 2219.2 |
|  | 4 | 27 | 375 | 438 | 750 | 594 | | 193.5 | 266.3 | 363.1 | 459.8 | 556.6 | 653.4 | 750.2 | 846.9 | 943.7 | 1234.0 |
|  | 8 | 60 | | 438 | 750 | 594 | | 215.0 | 295.9 | 403.4 | 510.9 | 618.5 | 726.0 | 833.5 | 941.0 | 1048.6 | 1371.1 |
| Sony +RW | 1 | 17.2 | 125 | 125 | 145 | 156 | | 95.3 | 184.8 | 267.0 | 349.2 | 431.4 | 513.6 | 595.7 | 677.9 | 760.1 | 1006.7 |
|  | 4 | 17.7 | 406 | 406 | 500 | 438 | | 84.6 | 142.8 | 211.5 | 280.1 | 348.8 | 417.5 | 486.2 | 554.9 | 623.6 | 829.6 |
|  | 8 | 23 | | 438 | 594 | 531 | | 65.3 | 106.5 | 151.1 | 195.8 | 240.4 | 285.0 | 329.6 | 374.2 | 418.9 | 552.7 |
| Maxnx +RW | 1 | 21.9 | 125 | 125 | 137 | 156 | | 114.7 | 235.3 | 339.9 | 444.6 | 549.2 | 653.9 | 758.5 | 863.2 | 967.8 | 1281.8 |
|  | 4 | 23.6 | 406 | 406 | 500 | 438 | | 112.8 | 190.4 | 281.9 | 373.5 | 465.1 | 556.7 | 648.3 | 739.8 | 831.4 | 1106.1 |
|  | 8 |  | | | | | | | | | | | | | | | |
| HPW Disc | 1 | 24.1 | 344 | 438 | 656 | 563 | | 604.4 | 922.3 | 1239.2 | 1556.1 | 1873.1 | 2190.0 | 2507.0 | 2823.9 | 3140.9 | 4091.7 |
|  | 4 | 56.2 | 344 | 438 | 750 | 594 | | 402.8 | 554.3 | 739.1 | 923.9 | 1108.6 | 1293.4 | 1478.2 | 1663.0 | 1847.7 | 2402.1 |
|  | 8 | 86.6 | 406 | 438 | 1000 | 781 | | 413.8 | 504.5 | 672.5 | 840.5 | 1008.5 | 1176.5 | 1344.6 | 1512.6 | 1680.6 | 2184.7 |
| Average +R | 1 | | | | | | | 267.2 | 439.6 | 616.6 | 793.5 | 970.5 | 1147.4 | 1324.4 | 1501.3 | 1678.2 | 2209.1 |
|  | 4 | | | | | | | 191.1 | 268.5 | 366.1 | 463.7 | 561.3 | 658.8 | 756.4 | 854.0 | 951.6 | 1244.3 |
|  | 8 | | | | | | | 207.2 | 284.8 | 388.3 | 491.8 | 595.3 | 698.8 | 802.3 | 905.7 | 1009.2 | 1319.7 |
| Average +RW | 1 | | | | | | | 210.0 | 420.0 | 606.9 | 793.7 | 980.6 | 1167.4 | 1354.3 | 1541.1 | 1728.0 | 2288.5 |
|  | 4 | | | | | | | 197.4 | 333.1 | 493.4 | 653.7 | 813.9 | 974.2 | 1134.4 | 1294.7 | 1455.0 | 1935.7 |
|  | 8 | | | | | | | 65.3 | 106.5 | 151.1 | 195.8 | 240.4 | 285.0 | 329.6 | 374.2 | 418.9 | 552.7 |
| Energy Ratio (HPW Disc/+R) | 1 | | | | | | | 2.3 | 2.1 | 2.0 | 2.0 | 1.9 | 1.9 | 1.9 | 1.9 | 1.9 | 1.9 |
|  | 4 | | | | | | | 2.1 | 2.1 | 2.0 | 2.0 | 2.0 | 2.0 | 2.0 | 1.9 | 1.9 | 1.9 |
|  | 8 | | | | | | | 2.0 | 1.8 | 1.7 | 1.7 | 1.7 | 1.7 | 1.7 | 1.7 | 1.7 | 1.7 |
| Energy Ratio (HPW Disc/+RW) | 1 | | | | | | | 2.9 | 2.2 | 2.0 | 2.0 | 1.9 | 1.9 | 1.9 | 1.8 | 1.8 | 1.8 |
|  | 4 | | | | | | | 2.0 | 1.7 | 1.5 | 1.4 | 1.4 | 1.3 | 1.3 | 1.3 | 1.3 | 1.2 |
|  | 8 | | | | | | | 6.3 | 4.7 | 4.4 | 4.3 | 4.2 | 4.1 | 4.1 | 4.0 | 4.0 | 4.0 |

Average Ratio HPW Disc to +R Overall: 1.9
Average Ratio HPW Disc to +RW Overall: 2.6

FIG. 4

Permanently Recording Data On An Optical Disc Using a High-Powered Drive — 85

| 90 | 91 | 92 |
|---|---|---|
| Operating a laser energy source and an objective lens such that the power at the disc is equal to or greater than 20 mW at DVD 1X | Operating a laser energy source and an objective lens such that the power at the disc is equal to or greater than 30 mW at DVD 4X | Operating a laser energy source and an objective lens such that the power at the disc is equal to or greater than 65 mW at DVD 8X |

| 93 | 94 | 95 |
|---|---|---|
| Generating a laser beam having a wavelength of approximately 405 nm | Generating a laser beam having a wavelength of approximately 650 nm | Generating a laser beam having a wavelength of approximately 780 nm |

| 96 | 97 | 98 |
|---|---|---|
| Forming indelible marks in a data layer having a thickness of approximately 10 nm | Forming indelible marks in a data layer having a thickness of approximately 20 nm | Forming indelible marks in a data layer having a thickness of approximately 40 nm |

FIG. 5

HIGH POWER OPTICAL DISC DRIVES

This application claims the benefit of U.S. Provisional Application No. 61/200,449 entitled "HIGH POWER OPTICAL DISC DRIVES" filed on Nov. 28, 2008, the contents of which are incorporated herein by reference.

FIELD OF THE INVENTION

The invention relates to optical disc drives capable of delivering high power energy to the surface of an optical disc.

DESCRIPTION OF RELATED ART

Optical disc drives are widely used to write data to, and to read data from, optical discs. Commercially important optical disc media currently include CD (compact disc), DVD (digital video disc), and Blu-ray formats.

A common theme in the development of optical disc drives has been to lower the power of laser energy that contacts the optical disc. This paradigm has been adopted for several compelling reasons. First, lower power translates to lower cost, both in manufacturing and in the final cost to consumers. Second, most optical disc media involve the use of organic dyes, which can photodegrade (or "bleach") upon exposure to high energy laser light. The use of lower power lasers reduces the likelihood of degradation of the disc's contents. Third, laser power affects the size and weight of the disc drive. Higher power lasers are larger and heavier than lower power lasers. The industry trend is to move towards smaller and lighter electronics, especially in notebook computers.

Disc drive laser powers are typically reported as the power of the laser or laser diode itself, and not the actual power out of the final objective lens that impacts the optical disc. The power of the laser is typically much higher than the power at the disc surface due to the losses inherent in any optical system. Power is also intentionally diverted due to splitting of the laser beam, or lost due to inefficiencies in the optical path that are tolerated for reasons of lower costs, et cetera. The following are several examples of reported high power lasers and laser diodes for use with optical discs.

Apple Computer's POWER MAC® G3 and G4 uses a DVD-RAM drive with a semiconductor GaAs 52 mW laser, but the power out of the objective lens is only 1.0 mW (typical for read), and 17.68 mW (maximum for write). Similarly, Apple's CD-ROM, CD-R, CD-RW, and CD-DA drives have a semiconductor GaAs laser, PIN diode hybrid type with a rated power of 0.3 mW, and power out of the objective lens is 0.18 mW (typical), and 2 mW (maximum). This information is contained in Apple Computer's support document entitled "POWER MACINTOSH® G3 and G4: About the DVD-RAM Drive" (last modification date Oct. 8, 2008).

Sony's CX-News internet magazine discussed 250 mW semiconductor laser diodes in CD-R/RW systems, and 100 mW semiconductor laser diodes for DVD+R/RW and DVD-R/R (volume 31; no date). The power at the surface of the disc was not reported.

Asthana et al. discuss how an "at disc" power of 8-20 mW corresponds to a power of 16-40 mW at the laser due to the head efficiency (*IBM J. Res. Dev.*, 40(5) (1996)). Laser power to the disc must be controlled very tightly. Thermal interference is discussed, where heat generated in the disc from writing a first mark interferes with writing a second, nearby mark. The authors mentioned that higher power "at disc" pulses generate undesirable heating of the disc, which takes time to dissipate.

A variety of blue-violet lasers for use in optical disc systems have been reported. Sanyo announced a high power blue-violet laser diode in 2003 (Sanyo Electric Co., Ltd. news release dated Mar. 23, 2003). The light output was described as 50 mW continuous or 100 mW pulsed. The power at the surface of the disc was not reported.

A blue-violet laser diode was described as operating reliably for more than 1000 hours with a light output power of 100 mW at 60° C. under pulsed operation (SPIE Proceedings Series; Apr. 18-21, 2004). The power at the surface of the disc was not reported.

Laser powers can be adjusted or calibrated to meet performance specifications for a particular disc, as described in EP Patent Publication No. WO 2006/049749 (published May 11, 2006). Marks are created in a disc using a variety of power settings. The reflectivity of the marks are compared, and the laser power is adjusted accordingly before writing desired data to the disc. Example 1 below discusses an example where a laser having an operating range of 40 mW has a laser power range of 10-20% of this total, or up to 4-8 mW.

Sanyo reported a blue-violet laser diode having an optical output of 450 mW under pulsed operation (Tech-on!; Oct. 6, 2008). The laser is suggested for use with 12× four-layer Blu-ray recording. The power at the surface of the disc was not reported.

U.S. Pat. No. 7,123,641 (issued Oct. 17, 2006) offers a semiconductor laser having stacked layers designed to reduce leakage of carriers from the active region, and to reduce overflow of carriers from the upper guide layer. The laser was described as stable in operation for 5,000 hours at 70° C. and a pulse of 230 mW. The patent suggests using the laser in an optical disc unit (as shown in FIG. 9 of the patent). The optical disc unit is described as operating with higher optical power than a conventional unit, but the power at the surface of the disc was not reported.

Applicant's own research and experimentation using a PULSTEC® ODU-1000 system (a commercially available analytical research tool designed by Pulstec Ltd. of Japan for the purpose of developing CD, DVD, and Blu-ray optical disc technologies and materials) has shown that the typical DVD+RW disc (for example) requires less than 7 mW of red laser power to write data to the disc at the base DVD write speed (commonly known as 1× write speed). With typical optical efficiencies, this could be achieved with a laser diode capable of approximately 20 mW output. Higher power laser diodes are used to enable faster write speeds. The required laser power may scale in approximately a linear fashion with speed, hence a 4× write speed (4 times the base speed) will require about 27 mW power at the disc surface, and about an 80 mW laser diode output. Enabling faster write speeds for all types of recordable optical media has been the major driver of higher power laser diodes in optical disc drives.

Of course, this higher power is not required to read back the data. The typical power at the disc surface during the data read process is less than 1 mW. This indicates that the data writing and data reading processes have fundamentally different constraints.

Applicant's own research and experimentation with alternative optical disc materials has lead to a desire for optical disc drives that can deliver higher power laser energy to the surface of an optical disc for the purpose of recording data in more durable materials. This need is fundamentally different than that of increasing the write speed. A survey of commercially available disc drives failed to reveal any products that claim to deliver sufficiently high power to the disc surface.

Accordingly, there exists a need for disc drive systems that can deliver high power to the surface of an optical disc when writing data.

SUMMARY OF THE INVENTION

Optical disc drives that can deliver high power to the surface of an optical disc are disclosed. The drives are configured such that laser energy upon first contact with the surface of an optical disc has a power of at least about 25 mW as measured at 1× write speed for a DVD format disc. Minimum energy figures for CD, Blu-ray, or other formats can also be derived.

DESCRIPTION OF THE FIGURES

The following figures form part of the present specification and are included to further demonstrate certain aspects of the present invention. The invention may be better understood by reference to one or more of these figures in combination with the detailed description of specific embodiments presented herein.

FIG. 4 shows a table of the energy per mark for recording data in conventional optical disc media as compared to the energy per mark for permanently recording in optical disc media with high power disc drives in accordance with embodiments of the present invention.

DETAILED DESCRIPTION OF THE INVENTION

While compositions and methods are described in terms of "comprising" various components or steps (interpreted as meaning "including, but not limited to"), the compositions and methods can also "consist essentially of" or "consist of" the various components and steps, such terminology should be interpreted as defining essentially closed-member groups.

Materials

The optical information media described below can generally be any shape and size. The media are typically flat and round in shape. Currently envisioned sizes are about 8 cm diameter, about 12 cm diameter (like a conventional CD or DVD), about 13 cm diameter, about 20 cm diameter, about 10 inch (about 25.4 cm) diameter, about 26 cm diameter, and about 12 inch (about 30.48 cm) diameter.

The optical information media described below generally include at least one support substrate. The support substrate can generally be any material compatible with use in optical information storage. Polymers or ceramic materials having desirable optical and mechanical properties are widely available. Support substrates typically comprise polycarbonate, polystyrene, aluminum oxide, polydimethyl siloxane, polymethylmethacrylate, silicon oxide, glass, aluminum, stainless steel, or mixtures thereof. If substrate transparency is not desired, then metal substrates may be used. Other optically transparent plastics or polymers may also be used. Support substrates can be selected from materials having sufficient rigidity or stiffness. Rigidity or stiffness is commonly measured as Young's modulus in units of pressure per unit area, and preferably is about 0.5 GPa to about 70 GPa. Specific examples of stiffness values are about 0.5 GPa, about 1 GPa, about 5 GPa, about 10 GPa, about 20 GPa, about 30 GPa, about 40 GPa, about 50 GPa, about 60 GPa, about 70 GPa, and ranges between any two of these values. Support substrates can be selected from materials having an index of refraction of about 1.45 to about 1.70. Specific examples of an index of refraction include about 1.45, about 1.5, about 1.55, about 1.6, about 1.65, about 1.7, and ranges between any two of these values.

The substrate preferably comprises materials that are not subject to age degradation effects. Presently preferred materials are polycarbonate, glass, and silicon oxide (fused silica).

The support substrate can generally be any thickness. The substrate thickness can be selected as a function of the drive capacity: 1.2 millimeter-thick substrates are compatible with CD drives, 0.6 millimeter-thick substrates are compatible with DVD drives, and 0.1 millimeter-thick substrates are compatible with BD drives. The thickness was historically chosen both to keep the rotating mass within reasonable limits while maintaining the necessary flatness and rigidity of the substrate to keep the data layer in focus during the read and the write process.

The data layer can comprise carbon, amorphous carbon, diamond-like carbon, silicon carbide, boron carbide, boron nitride, silicon, amorphous silicon, germanium, amorphous germanium, or combinations thereof. Amorphous carbon is a stable substance that requires a considerable amount of activation energy to modify its optical properties. This feature makes amorphous carbon unaffected by typical thermal and chemical kinetic aging processes. Amorphous carbon also possesses excellent chemical resistance, and a high degree of graphitic ($SP^2$) type carbon. Other examples of materials used in data layers include metals, metal alloys, metal oxides, glasses, and ceramics.

The metal in the data layer may comprise, consist essentially of, or consist of at least one metal or metal alloy. The metal can contain mixtures of two or more metals or metal alloys. Examples of metals and alloys include tellurium, tellurium alloys, selenium, selenium alloys, arsenic, arsenic alloys, tin, tin alloys, bismuth, bismuth alloys, antimony, antimony alloys, lead, and lead alloys. Examples of tellurium alloys include $Te_xSe_{100-x}$, $Te_xSe_{100-x}$ (where X is less than or equal to 95), $Te_{86}Se_{14}$, $Te_{79}Se_{21}$, $Te_xSb_{100-x}$, $Te_xSb_{100-x}$, (where X is less than or equal to 95), $Te_xSe_ySb_z$, $Te_xSe_ySb_z$ (where X+Y+Z=100), $Te_xSe_ySb_z$ (where X+Y+Z=100, Y is 10-30, and Z is 5-20), $Te_{75}Se_{20}Sb_5$, $Te_{72.5}Se_{20}Sb_{7.5}$, $Te_xSe_yIn_z$, $Te_xSe_yIn_z$ (where X+Y+Z=100), $Te_xSe_yIn_z$ (where X+Y+Z=100, Y is 10-30, and Z is 5-20), $Te_{75}Se_{20}In_5$, $Te_{72.5}Se_{20}In_{7.5}$, $Te_xSe_yPb_z$, $Te_xSe_yPb_z$ (where X+Y+Z=100), $Te_xSe_yPb_z$ (where X+Y+Z=100, Y is 10-30, and Z is 5-20), $Te_{75}Se_{20}Pb_5$, $Te_{72.5}Se_{20}Pb_{7.5}$, $Te_xSe_ySn_z$, $Te_xSe_ySn_z$ (where X+Y+Z=100), $Te_xSe_ySn_z$ (where X+Y+Z=100, Y is 10-30, and Z is 5-20), $Te_{75}Se_{20}Sn_5$, $Te_{72.5}Se_{20}Sn_{7.5}$, $Te_xSe_yBi_z$, $Te_xSe_yBi_z$ (where X+Y+Z=100), $Te_xSe_yBi_z$ (where X+Y+Z=100, Y is 10-30, and Z is 5-20), $Te_{75}Se_{20}Bi_5$, $Te_{72.5}Se_{20}Bi_{7.5}$, TeGeAs, TeGeSbS, $TeO_xGe$, $TeO_xSn$, Pb—Te—Se, Pb—Te—Sb, As—Te, and Ge—Te. Examples of other alloys include As—Se, Ge—Se, GeS, SnS, Sb—S, $Bi_xSb_{100-x}$, $Bi_xSb_{100-x}$ (where X is less than or equal to 95). Other examples of alloys include GeS, $As_2S_3$, SnS, $Sb_2S_3$, $Sb_{20}S_{80}$, GeSe, $As_2Se_3$, SnSe, $Sb_2Se_3$, $Bi_2Se_3$, GeTe, $Ge_{10}Te_{90}$, $As_2Te_3$, SnTe, $Sb_2Te_3$, PbTe, $Bi_2Te_3$, $As_{10}Te_{90}$, $As_{32}Te_{68}$, $InTe_3$, $In_2S_3$, CdTe, and $In_2Se_3$. Additional metals and alloys include nickel (Ni), chromium (Cr), titanium (Ti), stainless steel, gold (Au), platinum (Pt), palladium (Pd), Monel (an alloy of nickel, copper, and iron commonly used in marine applications), silicon (Si), AuSi, CuNi, and NiCr.

The data layer material may be any of a variety of materials or combination of materials including silicon, scandium, titanium, vanadium, chromium, iron, cobalt, nickel, zinc, yttrium, zirconium, niobium, molybdenum, technetium, ruthenium, rhodium, palladium, tantalum, osmium, iridium, platinum, and alloys thereof. These elements and/or the ranges of properties generally define families or classes of elements that are useful for forming the data layers in accordance with embodiments of the present invention. While the materials may consist of a single element for the data layer, combinations of elements including composites, mixtures, and alloys may also be used.

One of the advantages of the families of elements and materials described herein is that they often do not introduce negative effects that require additional layers in the media for the purpose of mitigating the negative effects. Alternatively stated, one or more layers that are typically needed in stacks of conventional optical media can often be omitted. For example, since the materials used in the data layer are resistant to corrosion, protective layers can often be omitted. The materials described herein also have sufficient optical contrast so that the reflective layer can often be omitted. The data layers formed of the materials described herein also act as good absorbers and dissipaters such that separate absorptive layers and separate dissipative layers can also often be omitted. The result is a very simple stack of layers in the optical information media of embodiments of the present invention.

The data layer can generally be any thickness. The data layer thickness provides optical absorption. A lower thickness limit can be about 10 nm or about 20 nm. An upper thickness limit can be determined by the energy required to modify the data layer, and will vary depending on the material chosen. An example of an upper limit is about 100 nm. Example thicknesses are about 10 nm, about 20 nm, about 30 nm, about 40 nm, about 50 nm, about 60 nm, about 70 nm, about 80 nm, about 90 nm, about 100 nm, and ranges between any two of these values. A thickness value can be theoretically calculated as lambda/2n, where lambda is the read wavelength, and n is the index of refraction of the layer.

The data layer can generally be any thickness. An example lower thickness limit can be about 2 nm. An example upper thickness limit can be about 250 nm. Example thicknesses are about 2 nm, about 4 nm, about 6 nm, about 8 nm, about 10 nm, about 12 nm, about 14 nm, about 16 nm, about 18 nm, about 20 nm, about 22 nm, about 24 nm, about 25 nm, about 26 nm, about 28 nm, about 30 nm, about 32 nm, about 34 nm, about 35 nm, about 36 nm, about 38 nm, about 40 nm, about 50 nm, about 60 nm, about 70 nm, about 80 nm, about 90 nm, about 100 nm, about 110 nm, about 120 nm, about 130 nm, about 140 nm, about 150 nm, about 160 nm, about 170 nm, about 180 nm, about 190 nm, about 200 nm, about 210 nm, about 220 nm, about 230 nm, about 240 nm, about 250 nm, and ranges between any two of these values.

One embodiment of the present invention is directed towards optical disc drives that can deliver high power to the surface of an optical disc. High power allows the use of disc materials that could not be effectively written to using conventional disc drives. These materials may be more durable than conventional disc materials, allowing the development of long term archival data storage. The use of higher powers may also allow development of new write strategies to optimize performance of optical discs. Additionally, higher power will also be required to enable faster data writing or data transfer rates in new materials using new write strategies. However, these higher powers will start with a significantly higher base power, potentially leading to the need for laser powers on the order of 1 watt or more. In some cases, lasers having base laser powers of 2 watts or more may be used.

It is to be understood that the optical disc drives in accordance with embodiments of the present invention are typically directed to non-analytical instruments. The high power optical disc drives may be any optical disc reading and/or optical disc writing drive that does not include the optimization tools for developing write strategies like the analytical research tool, PULSTEC® ODU-1000. High power disk drives in accordance with embodiments of the present invention typically will not include an oscilloscope or optimization software. Such high power disc drives typically have few or no modules for measuring and/or outputting a variety of error measurements to a user.

In one embodiment for example, the high power drive may be an optical disc writer/reader from Pioneer, a Japanese company, having a writing laser rated for maximum power of any value in a range from about 60 mW to about 250 mW or more. Other optical disc drives of any make and model having high capacity laser power may be modified to be high power optical disc drives. Optical disc drives having lasers with such high capacity can be configured to provide high power optical disc drives. That is, if the drives are modified to deliver powers (after inefficiency losses) at the disc surface within at least some of the ranges described herein, then these drives may be considered to be high power drives in accordance with embodiments of the present invention. The modification of such drives includes reconfiguring the firmware. Other modifications may include providing more efficient optics in the drives and/or changing circuitry in the hardware.

Figure 1:
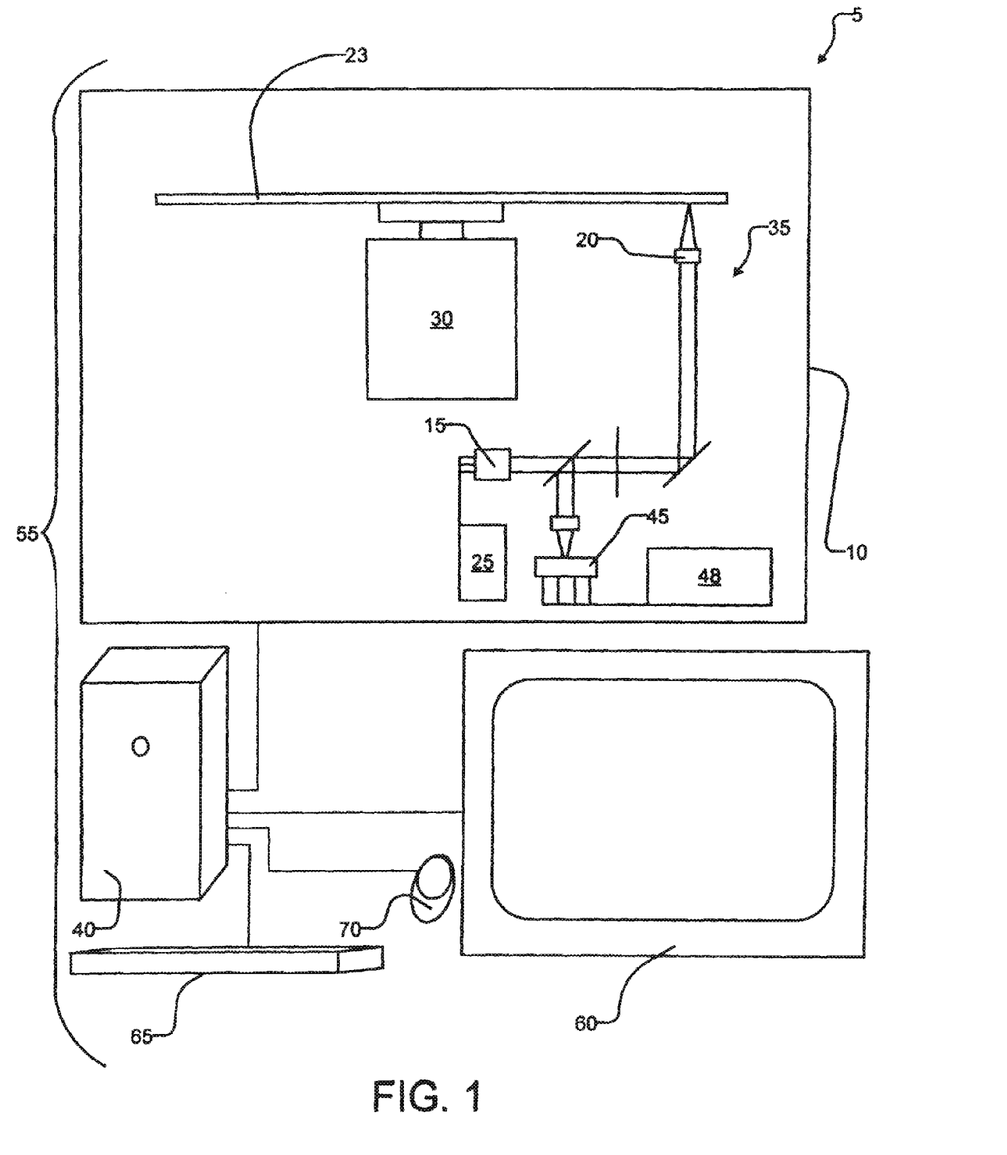
FIG. 1 shows an optical disc drive system having one laser and one optical pickup.

As shown in FIG. 1, a high-powered optical disc drive 5 can comprise a housing 10, at least one laser energy source 15, at least one objective lens 20, at least one data encoder 25, and at least one optical disc rotation mechanism 30. The laser energy source 15, objective lens 20, and the optical disc rotation mechanism 30 are all disposed within the housing 10. The laser energy source 15 produces laser energy, and is operably connected with the objective lens 20 to deliver laser energy to the surface of an optical disc 23 held by the optical disc rotation mechanism 30. The optical disc drive 5 is configured such that laser energy upon first contact with the surface of an optical disc 23 has a power of at least about 18 mW, at least about 19 mW, at least about 20 mW, at least about 21 mW, at least about 22 mW, at least about 23 mW, or at least about 24 mW as measured at the DVD 1× write speed. In another embodiment, the optical disc drive 5 is configured such that laser energy upon first contact with the surface of an optical disc 23 has a power of at least about 25 mW as measured at the DVD 1× write speed. For writing at higher speeds, higher powers are required. Disc drives 5 include control electronics, read/write electronics, and an interface. The disc drives 5 also include an optical pick up unit ("OPU") 35, which may include the laser 15, optics, tracking motor, and slide mechanism. An optical objective assembly forms a subset of the OPU and includes the optical components, amplifiers, and diodes of the optical disc drive 5. Various components of such a system are well known and are not specifically shown and described herein. For example the optics will typically include several collimator lenses, as well as the quarter wave plate and mirrors that are shown.

The housing 10 can generally be any housing sufficient to house the various parts of the disc drive. The housing 10 can comprise or be made of a variety of materials such as plastics and metals. The housing can be designed and configured such that it is used outside of a computer 40. The drive 5 can be attached to the computer 40 by cables, as shown in FIG. 1, or through a wireless connection. Alternatively, the housing 10 can be designed and configured such that it is used inside of a computer, such as in a bay or disc drive slot.

The laser energy source 15 can be a laser, a laser diode, or a diode-pumped solid-state laser. The laser energy source 15 can produce laser energy at a variety of wavelengths. The wavelength can be selected depending on the type of optical disc used, and the materials contained within the optical disc 23. Examples of wavelengths include approximately 405 nm (such as used in Blu-ray media), approximately 650 nm (such as used in DVD media), and approximately 780 nm (such as used in CD media). In order to achieve higher data density, it is usually advantageous to use a shorter wavelength. Therefore, ultraviolet wavelengths of about 200 nm to about 350 nm may be useful in future optical disc technologies.

It is also highly desirable to be able to modulate the light energy from the laser 15 at a very high rate to enable data to be written quickly. This is one advantage of the laser diode light source, which can be switched electronically at very high speeds. Gigahertz switching speeds are common today in laser diodes in the IR range for telecommunications applications. Such speeds will also be strongly desired in high-performance optical disc drives. Other methods of modulating laser light include the use of acousto-optical or electro-optical modulators in which various crystals are subjected to an electrical field that can be modulated at high speeds. The electric field alters the optical properties of these crystals, leading to a modulation of the laser light. These methods have not been historically as easy to implement as the electrical modulation of a laser diode, and have not been used in commercial optical disc drives, but have been used in some CD and DVD disc mastering systems for volume production of optical discs.

The objective lens 20 focuses and directs laser energy from the laser energy source to the optical disc 23. The objective lens 20 can be made from any transparent material that is easily formed, typically by precision molding. Most objective lenses are presently made of plastic via injection molding to reduce cost, albeit at the expense of optical efficiency. Alternatively, various kinds of optical glasses or quartz may be used. As laser wavelengths are reduced into the ultraviolet range in future optical disc systems, it will be less desirable to use many plastics and glasses due to their high absorption of ultraviolet light.

The data encoder 25 functions to take data from an operably attached computer 40 or other data source, and convert the data into a pattern of marks to be written to an optical disc 23 using laser energy. This data encoder 25 is typically a special integrated circuit that controls the optical disc drive.

The optical disc rotation mechanism 30 functions to hold and rotate an optical disc 23 that is placed within the disc drive 5. The rotation mechanism 30 can rotate the disc at a constant speed, or at a variable speed. Disc drive speeds are commonly expresses as a certain value of "×" speed, where × refers to a certain rate of data transfer (1.35 MB/second for DVD). Write speeds are usually referred to as positive non-zero multiples of × such as 1×, 2.4×, 4×, 8×, 12×, and so on. The multiple is a data rate, where 1× corresponds to 1.35 MB/second for a DVD, for example, and approximately 4.5 MB/second for Blu-ray. A speed of 2× provides a data rate twice that of 1×. Optical disc drives typically operate at a constant linear velocity (CLV) that keeps the linear distance scanned by the read/write head along a track constant per unit time. The disc rotation in revolutions per unit time therefore varies, slowing when reading or writing outer disc tracks, relative to the rotation when reading or writing inner disc tracks due to the difference in the radii of the track on the disc. Examples of DVD speeds include 1× (1.35 MB/second), 2× (2.70 MB/second), 4× (5.40 MB/second), 6× (8.10 MB/second), 8× (10.80 MB/second), 12× (16.20 MB/second), 16× (21.60 MB/second), 18× (24.30 MB/second), and 20× (27.00 MB/second). Examples of Blu-ray speeds include 1× (4.5 MB/second), 2× (9.0 MB/second), 4× (18.0 MB/second), 6× (27.0 MB/second), 8× (36.0 MB/second), and 12× (54.0 MB/second).

The laser energy upon contact with the surface of an optical disc 23 has a power of at least about 18 mW to about 25 mW when writing data at a DVD 1× (1.35 MB/second) speed. Power can be measured by simply placing an optical detector 45 such as a photodiode suitable for reading a signal from reflected laser light at the selected laser wavelength and power level. This reflected laser light is deflected for detection by the optical detector 45. The optical detector 45 may be a laser detector, model 818-SL by Newport Corp., Irvine, Calif. The power measured is indicative of the power delivered to the disc surface since the disc is located at the output of the OPU. A decoder 48 is also connected to the optical detector 45 for decoding data that is read from an optical disc 23.

Specific examples of power levels at the disc surface for a DVD 1× speed are about 18 mW, about 19 mW, about 20 mW, about 25 mW, about 30 mW, about 35 mW, about 40 mW, about 45 mW, about 50 mW, about 60 mW, about 65 mW, about 70 mW, about 80 mW, about 90 mW, about 100 mW, about 110 mW, about 120 mW, about 130 mW, about 140 mW, about 150 mW, about 160 mW, about 170 mW, about 180 mW, about 190 mW, about 200 mW, about 210 mW, about 220 mW, about 230 mW, about 240 mW, about 250 mW, and ranges between any two of these values. Generally, higher power levels may be used to enable use of a wider variety of materials and/or to enable higher writing speeds, up until excessive destructive heating of the optical disc 23 occurs. The amount of power needed to cause excessive heating will vary depending on the materials used in the optical disc 23, the degree of ventilation or cooling within the disc drive, the speed at which the optical disc 23 is rotated, and so on.

Figure 2:
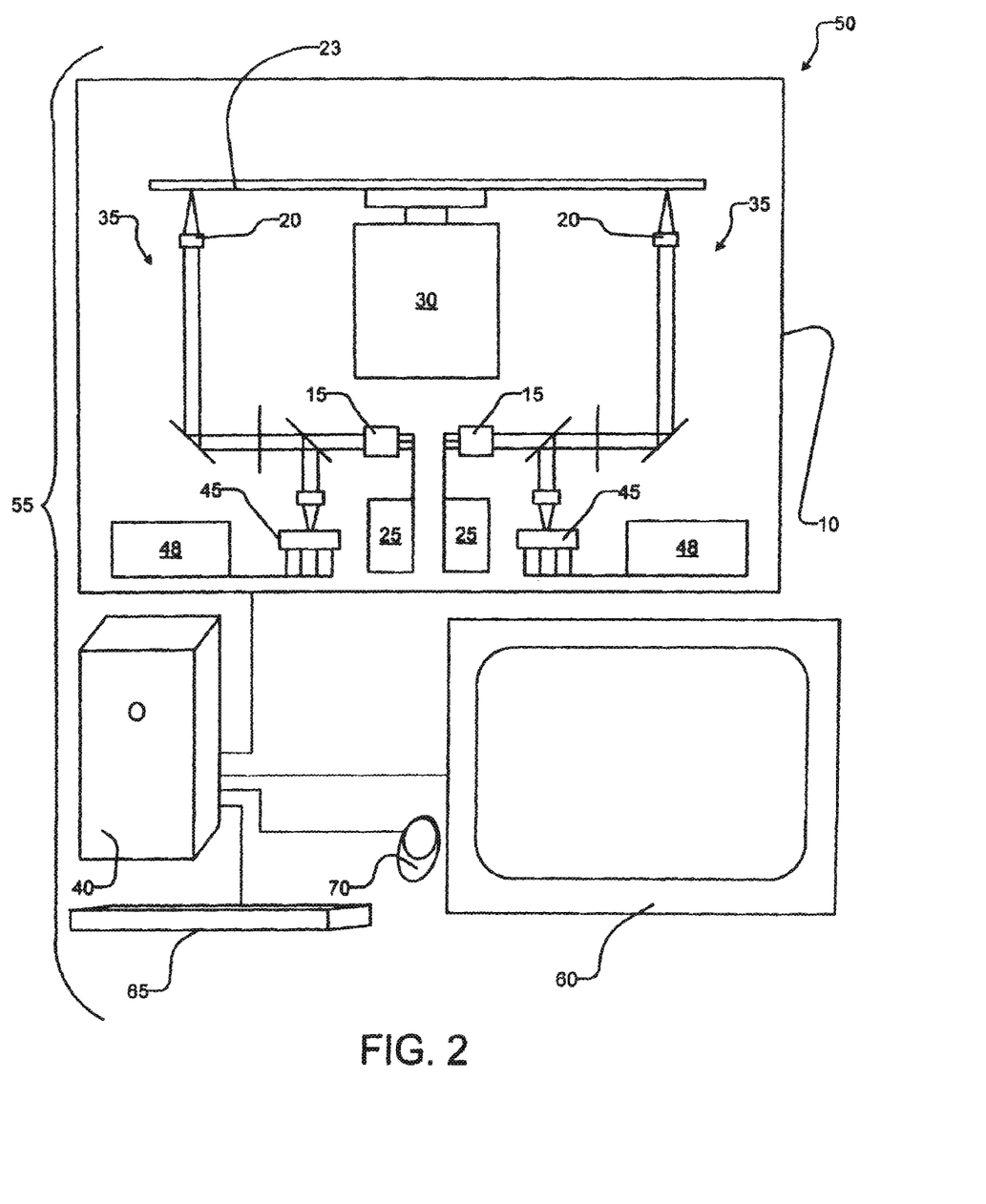
FIG. 2 shows an optical disc drive system having two lasers and two optical pickups.

FIG. 2 shows an alternative embodiment of a high-powered disc drive 50. In some embodiments, it may be desirable to have an optical disc drive 50 that can simultaneously write data to multiple portions of the optical disc 23. This can be accomplished if the optical disc drive 50 contains two or more optical pick ups 35 (sometimes referred to as "write heads"). The ability to write data to multiple portions of the optical disc 23 will increase the effective data transfer rate of the optical disc drive 50. Examples of the number of optical pick ups 35 (write heads) in the optical disc drive can be 2, 3, 4, 5, 6, or more. Typically, each write head 35 would comprise a laser energy source 15, although it is possible for the optical disc drive 50 to contain one laser energy source 15, where the laser energy is split between the multiple write heads 35. It is presently more practical for each write head 35 to have its own laser energy source. At least one of the optical pick ups 35 would be configured such that laser energy upon first contact with the surface of an optical disc 23 has the defined minimum mW power described above. Typically, all of the optical pick ups 35 would be configured such that laser energy upon first contact with the surface of an optical disc 23 has the defined minimum mW power described above.

In embodiments containing multiple optical pick ups 35, each optical pick up 35 can be the same or different from the other(s). A particular optical pick up 35 can be configured to write data, read data, or both read and write data. For example, an optical disc drive 50 can contain two optical pick ups 35, one configured to write data, and one configured to read data.

Optical pick ups 35 configured to only read data can have a lower power level than pick ups 35 configured to write data. Alternatively, the pick ups can be configured to operate at lower power levels when reading.

Figure 3:
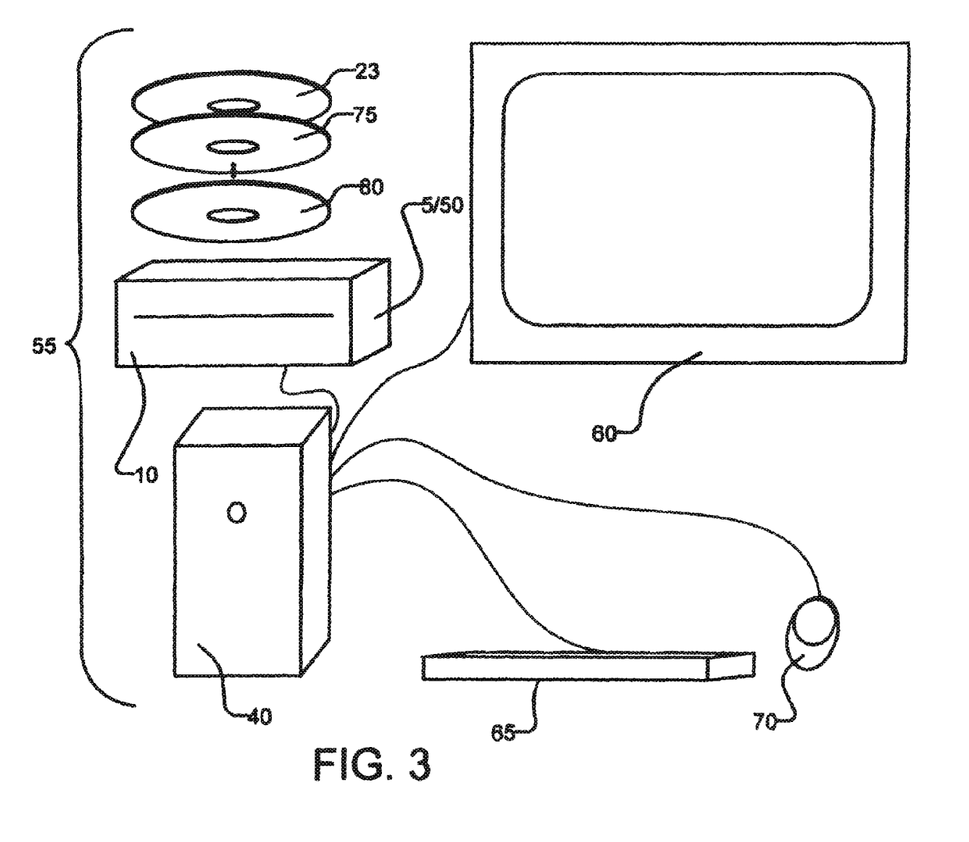
FIG. 3 shows an optical disc drive like that of FIG. 1 or FIG. 2 as part of a system for use in writing and reading optical disc media.

FIG. 3 shows a system 55 that includes an optical disc drive 5/50, a computer 40, and user interface elements in the form of a screen 60, a keyboard 65, and a mouse 70. The system 55 also includes multiple optical discs 23, 75, 80, which may comprise a variety of conventional discs 75, 80 having a variety of disc types and data materials. The drive 5/50 may be configured to read any disc type having any data layer materials. On the other hand, the drive 5/50 is a high-powered drive that is configured to write to the discs 23 that have materials that have been provided specifically for receiving more permanent or indelible marks through high power writing. In particular, there is more energy imparted in each of the marks formed in the discs 23. The greater energy imparted to data layer material in the discs 23 results in physical removal of material that forms permanent or indelible marks in accordance with embodiments of the present invention.

FIG. 4 shows a table of write speeds, powers, pulse lengths, mark sizes, and energies imparted to data layers to form each size of mark in conventional optical discs and in discs configured for writing with the high power disc drives 5/50. The table of FIG. 4 shows values for a variety of conventional discs in comparison to the high power write optical disc (HPW Disc) in accordance with embodiments of the present invention. As is known, mark sizes are designated in ascending order of length as 3T, 4T, 5T, 6T, 7T, 8T, 9T, 10T, 11T, and 14T. The longer marks require more energy since more material in the data layer must be affected to make the longer marks. In accordance with embodiments of the present invention, each mark size is created by imparting more energy to the HPW Disc (corresponding to disc 23 of FIG. 3) than is used to make the marks on conventional discs. In the table of FIG. 4, $E_n$ represents the energy imparted to the data layers of respective optical discs (HPW Disc and conventional discs) to create the various sizes of marks where "n" is a number corresponding to the coefficient of the "T" value. Also, more energy on average is used for writing data to the high power write disc in accordance with embodiments of the present invention than is used for writing data to the conventional discs. For example, the energy delivered to the disc for optimally writing to the high power write optical disc is about 1.9 times higher to about 2.6 times higher than the energy delivered to the conventional optical discs on average overall. In fact, writing to conventional discs at the high powers intended for high power write discs with the high-powered drives in accordance with the embodiments of the present invention would be destructive to the conventional discs.

In one case, the energy delivered to a mark is at least 1.2 times the energy delivered to a mark of the same size in at least one of a dye data layer material and a phase change data layer material that are typically found in conventional optical discs. In another case, the laser energy delivered to a mark may be at least 1.5 times the energy delivered to a mark of the same size in at least one of the dye data layer material and the phase change data layer material. In still another case, the laser energy delivered to a mark may be at least 1.9 times the energy delivered to a mark of the same size in at least one of a dye data layer material and a phase change data layer material. These levels of energy delivered may be at any write speed and at any mark size.

Methods of Preparation

Additional embodiments of the invention are directed towards methods of preparing an optical disc drive. The various components of the optical disc drive can be those described above.

In one embodiment, the method can comprise providing a housing, at least one laser energy source, at least one objective lens, at least one data encoder, and at least one optical disc rotation mechanism; disposing the laser energy source in the housing; disposing the objective lens in the housing; disposing the data encoder in the housing; disposing the optical disc rotation mechanism in the housing; and operably connecting the laser energy source and the objective lens to assemble the disc drive, such that laser energy produced by the laser energy source has a power of at least about 60 mW as measured at 1× write speed at the surface of an optical disc. The method can further comprise disposing at least one optical pick up in the housing. The method can further comprise providing at least one optical disc, and placing the optical disc in the disc drive such that the optical disc rotation mechanism holds and rotates the optical disc. The laser energy source can produce laser energy having a wavelength of about 405 nm, about 650 nm or about 780 nm. In certain embodiments, the method can comprise disposing two or more laser energy sources in the housing.

Methods of Use

An additional embodiment of the invention is directed towards methods of using an optical disc drive to write data to an optical disc. The various components of the optical disc drive can be those described above.

A method for using an optical disc drive can comprise: providing an optical disc drive, providing an optical disc; placing the optical disc in the optical disc drive; sending data to the optical disc drive; and storing the data in a pattern of marks in the optical disc; wherein: the optical disc drive comprises a housing, at least one laser energy source, at least one objective lens, at least one data encoder, and at least one optical disc rotation mechanism; the laser energy source and the objective lens are operably connected; the objective lens directs laser energy from the laser energy source to the optical disc; the data encoder converts the data into a pattern of marks to be written to the optical disc using laser energy; and laser energy produced by the laser energy source has a power of at least about 20 mW, at least about 30, mW, at least about 40 mW, at least about 50 mW, at least about 60 mW, at least about 65 mW, or at least about 80 mW delivered to the optical disc surface at any write speed. In one embodiment, the laser energy is about 60 mW as measured at DVD 1× write speed at the surface of the optical disc. The laser energy source can be a laser, diode-pumped solid-state laser, or laser diode. The laser energy source can produce laser energy having a wavelength of about 405 nm, about 650 nm or about 780 nm. In certain embodiments, the optical disc drive can comprise two or more laser energy sources. The use of multiple laser energy sources and optical pick ups will increase the effective data transfer rate of the optical disc drive.

Figure 5:
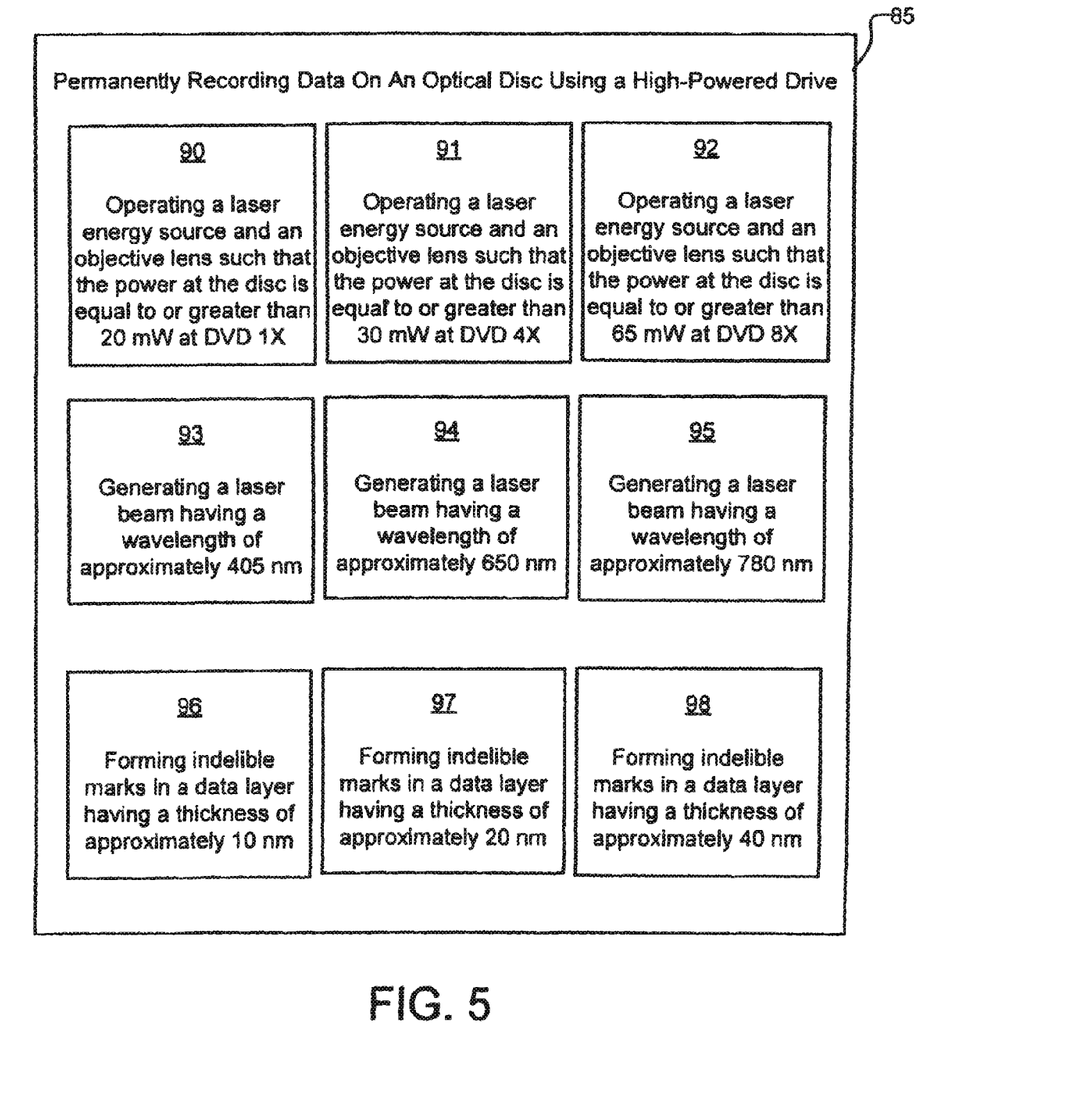
FIG. 5 shows a block diagram of a method of using an optical disc drive for recording digital data on optical disc media by delivering high power/energy to the media.

With reference to the block diagram of FIG. 5, the method of using a high-powered optical disc drive and an optical disc configured for receiving data during writing with the high-powered optical disc drive may include a method of permanently recording data on the optical disc, as indicated at 85. Within this method, different operating powers may be selected to deliver power and energy to the optical disc for making digital data marks at different write speeds as indicated at 90, 91, 92. As is apparent from the table of FIG. 4, higher write speeds require higher write powers. Different laser wavelengths are available and are selectable for the particular format of media to which data is to be written, as indicated at 93, 94, 95. The data layer in the optical disc receiving data in the form of permanent marks may include any of a variety of permanently deformable materials of any of a range of thicknesses, examples of which are listed herein. The thicknesses of these data layers may be any of a variety of thicknesses including those listed herein. In the example of FIG. 5, the thicknesses of the data layers provided in the optical discs may be approximately 10 nm, approximately 20 nm, or approximately 40 nm, as indicated at 96, 97, 98. The methods may include using data layer thicknesses inside or outside the ranges listed herein.

In some embodiments, the optical disc comprises at least one of a metal and a metal alloy in a data layer of the optical disc. In these embodiments, the method may include permanently recording digital data in the data layer that includes one or more metal(s) or metal alloy(s) by forming indelible data marks in the data layer material. In some embodiments, the optical disc comprises chromium in a data layer of the optical disc. In these embodiments, the method may include permanently recording digital data in the data layer that includes chromium by forming indelible data marks in the data layer material.

The method may include creating a mark by delivering at least 1.2 times the energy that would be delivered to a mark of the same size in at least one of a dye data layer material and a phase change data layer material. Alternatively, the method may include delivering at least 1.5 times the energy that would be delivered to a mark of the same size in at least one of a dye data layer material and a phase change data layer material in order to create a permanent data mark. Further alternatively, the method may include delivering at least 1.9 times the energy that would be delivered to a mark of the same size in at least one of a dye data layer material and a phase change data layer material in order to create a permanent data mark in the optical disc.

In one embodiment, the method includes writing at a speed of DVD 1× and delivering at least 20 mW of power per mark at the surface of optical disc. In another embodiment, the method includes writing at a speed of DVD 4× and delivering at least 30 mW of power per mark at the surface of optical disc. In still another embodiment, the method includes writing at a speed of DVD 8× and delivering at least 65 mW of power per mark at the surface of optical disc.

The table of FIG. 4 shows the energy required to create the various marks for optimum writing conditions. As shown, the energy for writing to the high power write optical media labeled HPW Disc, which is configured for permanent or indelible writing, is about twice the value of the energy for creating marks in conventional optical discs. Under non-optimal conditions, creation of the marks may be accomplished with greater or lesser energy per mark. However, a conservative estimation outside the ranges of energies shown captures the distinct energy delivery and absorption that occurs when practicing embodiments of the present invention. For example, in accordance with the method, laser energy produced by the laser energy source delivers greater than or equal to 300 Pico joules per 3T mark. This is in contrast to the energy per 3T mark for conventional optical discs, which is well under 300 Pico joules for all write speeds, as shown in the table of FIG. 4. Similar comparisons can be made for each mark size at each write speed.

Forming indelible marks in accordance with embodiments of the present invention generally comprises forming marks that are not readily changed or destroyed. The term indelible, as used herein, refers to marks in data material that are made permanent such as by physically translating or moving material from one location to another, which is accomplished by laser power in accordance with embodiments of the present invention. One example of the results of such movement of data material is a physical pit forming a depression relative to an unmarked portion of the data layer. These indelible marks are physically different from the marks of erasable or rewritable data. Marks made by changing the color of a dye or marks made by changing the phase of a material between crystalline and amorphous states are not considered to be indelible or permanent.

The following examples are included to demonstrate preferred embodiments of the invention. It should be appreciated by those of skill in the art that the techniques disclosed in the examples which follow represent techniques discovered by the inventor(s) to function well in the practice of the invention, and thus can be considered to constitute preferred modes for its practice. However, those of skill in the art should, in light of the present disclosure, appreciate that many changes can be made in the specific embodiments which are disclosed and still obtain a like or similar result without departing from the scope of the invention.

EXAMPLES

Prophetic Example 1

Preparation of a High-Powered Disc Drive

A commercially available DVD disc drive from Toshiba America, Inc. (New York, N.Y.) would be obtained. The control electronics and read/write electronics would be modified appropriately. A custom-built optical pick up, integrating the read laser and high-power write laser to be obtained from Pulstec Industrial Co., Ltd. (Hamamatsu City, Japan), the optics (designed for this higher power), and the tracking and autofocusing positioning mechanisms would be installed in the drive housing. Programmable devices would be loaded with appropriate firmware for controlling all the preceding components. These steps would result in a working optical disc drive that delivers high power laser energy to the surface of an optical disc.

Example 2

Using a High-Powered Disc Drive to Write to a Chromium Data Layer

A commercially available polycarbonate substrate having a conventional wobble groove was sputter coated with chromium to form a layer having a thickness in a range from about 10 nm to about 40 nm to form an unbonded optical disc. Digital data was written at a speed of DVD 1× to the disc by forming indelible marks of a variety of sizes in the chromium layer using a PULSTEC® ODU-1000. The marks were formed by delivering pulsed power within a range from about 90 mW to about 100 mW at the surface of the disc. The disc was then tracked and read in the ODU-1000, showing that such powers and such data materials can be used to form permanent readable data in optical disc media.

Example 3

Using a High-Powered Disc Drive to Write to a Chromium Data Layer of a Bonded Optical Disc Commercially available polycarbonate substrates were obtained. The base substrate, having a conventional wobble groove, was sputter coated with chromium to form a data layer having a thickness of about 20 nm. The dummy substrate was placed and bonded atop the data layer and the base substrate to form a bonded optical disc. Digital data was written at a speed of DVD 1× to the disc by forming indelible marks of a variety of sizes in the chromium layer using a PULSTEC® ODU-1000 delivering a pulsed laser power of about 31 mW at the surface of the optical disc. The optical disc was tracked and read with a modulation in a range between about 70% to about 75% and a bucket jitter of about 4.3 ns. The ODU-1000 was used to write to a substantially identical optical disc at DVD 4× with a pulsed power at the surface of the disc of 65 mW. Once again, the chromium data layer optical disc had a modulation of about 70% to about 75% and a bucket jitter of 4.3 ns. This shows that such powers and such data materials can be used to form permanent readable data in optical disc media that can be read in non-analytical research instruments such as high power drives and other drives.

All of the compositions and/or methods and/or processes and/or apparatus disclosed and claimed herein can be made and executed without undue experimentation in light of the present disclosure. All of the patents and references cited herein are incorporated by reference in their entireties to the extent that such patents and references are not inconsistent with the explicit teachings of this specification. While the compositions and methods of this invention have been described in terms of preferred embodiments, it will be apparent to those of skill in the art that variations may be applied to the compositions and/or methods and/or apparatus and/or processes and in the steps or in the sequence of steps of the methods described herein without departing from the concept and scope of the invention. More specifically, it will be apparent that certain agents which are both chemically and physically related may be substituted for the agents described herein while the same or similar results would be achieved. All such similar substitutes and modifications apparent to those skilled in the art are deemed to be within the scope and concept of the invention.

What is claimed is:

1. An optical disc drive comprising:
    a housing;
    at least one objective lens disposed within the housing;
    at least one optical disc rotation mechanism disposed within the housing;
    at least one laser energy source disposed within the housing and configured to deliver laser energy through the objective lens to an optical disc positioned in the rotation mechanism; and
    at least one data encoder within the housing that converts data into a pattern of marks to be written to a data layer of the optical disc using laser energy, wherein the optical disc drive is configured to write each of the marks of the pattern to the optical disc using sufficient laser energy to physically change the data layer material to form an indelible mark, wherein the laser energy delivered to the surface of the optical disc is greater than or equal to 300 Pico joules for an area the size of a 3T mark.

2. The optical disc drive of claim 1, wherein the laser energy source is a laser, diode-pumped solid-state laser, or laser diode.

3. The optical disc drive of claim 1, wherein the laser energy source produces laser energy having a wavelength of about 405 nm, about 650 nm, or about 780 nm.

4. The optical disc drive of claim 1, wherein the laser energy delivered to the surface of the optical disc has a power of at least about 25 mW as measured at CD 1× write speed.

5. The optical disc drive of claim 1, wherein the laser energy delivered to the surface of the optical disc has a power of at least about 100 mW as measured at DVD 1× write speed (1.35 MB/second).

6. The optical disc drive of claim 1, wherein the laser energy delivered to the surface of the optical disc has a power of at least about 200 mW as measured at DVD 1× write speed (1.35 MB/second).

7. The optical disc drive of claim 1, wherein the laser energy delivered to write each of the marks on the optical disc at a particular write speed is at least 1.9 times the laser energy needed to write a mark of the same size on a DVD+R disc at the same write speed and at least 1.9 times the laser energy needed to write a mark of the same size to a DVD+RW disc at the same write speed, wherein the DVD+R or DVD+RW has a dye data layer or a phase-change material.

8. The optical disc drive of claim 1, comprising two or more laser energy sources and two or more objective lenses.

9. The optical disc drive of claim 1, further comprising at least one optical pick up.

10. The optical disc drive of claim 1, further comprising at least two optical pickups.

11. The optical disc drive of claim 1, further comprising at least two identical optical pickups.

12. The optical disc drive of claim 1, wherein the indelible mark is a physical pit forming a depression relative to an unmarked portion of the data layer.

13. The optical disc drive of claim 1, wherein the laser energy delivered to the surface of the optical disc has a power of at least about 100 mW as measured writing to a BD at 1× write speed (4.5 MB/second).

14. The optical disc drive of claim 1, wherein the encoder is configured to produce an indelible mark in a metal, a metal alloy, or chromium metal in the data layer of the optical disc.

15. A method for permanently recording data on an optical disc, the method comprising:
    providing a disc drive having a housing, at least one laser energy source, at least one objective lens, at least one data encoder, and at least one optical disc rotation mechanism;
    converting data into a pattern of marks to be written to an optical disc; and
    writing each of the marks of the pattern to a data layer of the optical disc using sufficient laser energy to physically translate or move material in the data layer to form an indelible mark, and wherein physically translating or moving material includes a change other than a die color change or a phase change between crystalline and amorphous and wherein the laser energy delivered to the surface of the optical disc is greater than or equal to 300 Pico joules for an area the size of a 3T mark.

16. The method of claim 15, further comprising providing at least one optical disc, and placing the optical disc in the disc drive such that the optical disc rotation mechanism holds and rotates the optical disc.

17. The method of claim 15, wherein the laser energy source is a laser, diode-pumped solid-state laser, or laser diode.

18. The method of claim 15, wherein the laser energy source produces laser energy having a wavelength of about 405 run, about 650 nm, or about 780 nm.

19. The method of claim 14, wherein:
    the optical disc comprises chromium in the data layer of the optical disc; and
    permanently recording digital data in the data layer.

20. The method of claim 15, wherein the disc drive comprises two or more laser energy sources in the housing.

21. The method of claim 15, wherein:
the optical disc comprises at least a metal or a metal alloy in the data layer of the optical disc; and
permanently recording digital data in the data layer.

22. The method of claim 15, further comprising delivering at least 1.2 times greater energy per mark than would be delivered to create a mark of the same size in DVD+R and DVD+RW discs at the same write speed.

23. The method of claim 15, further comprising delivering at least 1.5 times greater energy per mark than would be delivered to create a mark of the same size in DVD+R and DVD+RW discs at the same write speed.

24. The method of claim 15, further comprising delivering at least 1.9 times greater energy per mark than would be delivered to create a mark of the same size in DVD+R and DVD+RW discs at the same write speed.

25. The method of claim 15, further comprising:
writing at a speed of DVD 4×; and
delivering at least 30 mW of power at the surface of optical disc.

26. The method of claim 15, further comprising:
writing at a speed of DVD 8×; and
delivering at least 65 mW of power at the surface of optical disc.

27. A method for using an optical disc drive, the method comprising:
providing an optical disc drive,
providing an optical disc, wherein the optical disc comprises a metal, a metal alloy, or chromium metal in the data layer;
placing the optical disc in the optical disc drive;
sending data to the optical disc drive; and
storing the data in a pattern of marks in the optical disc by converting data into a pattern of marks to be written to a data layer of the optical disc and writing each of the marks of the pattern to the optical disc using laser energy greater than or equal to 300 Pico joules for an area the size of a 3T mark delivered to the surface of the optical disc to form a physical pit forming a depression relative to an unmarked portion of the data layer wherein the physical pit is made in the metal, the metal alloy, or chromium metal in the data layer.

28. The method of claim 27, wherein the laser energy source is a laser, diode-pumped solid-state laser, or laser diode.

29. The method of claim 27, wherein the laser energy source produces laser energy having a wavelength of about 405 nm, about 650 nm, or about 780 nm.

30. The method of claim 27, wherein the optical disc drive comprises two or more laser energy sources.

\* \* \* \* \*